United States Patent Office 3,127,113
Patented Mar. 31, 1964

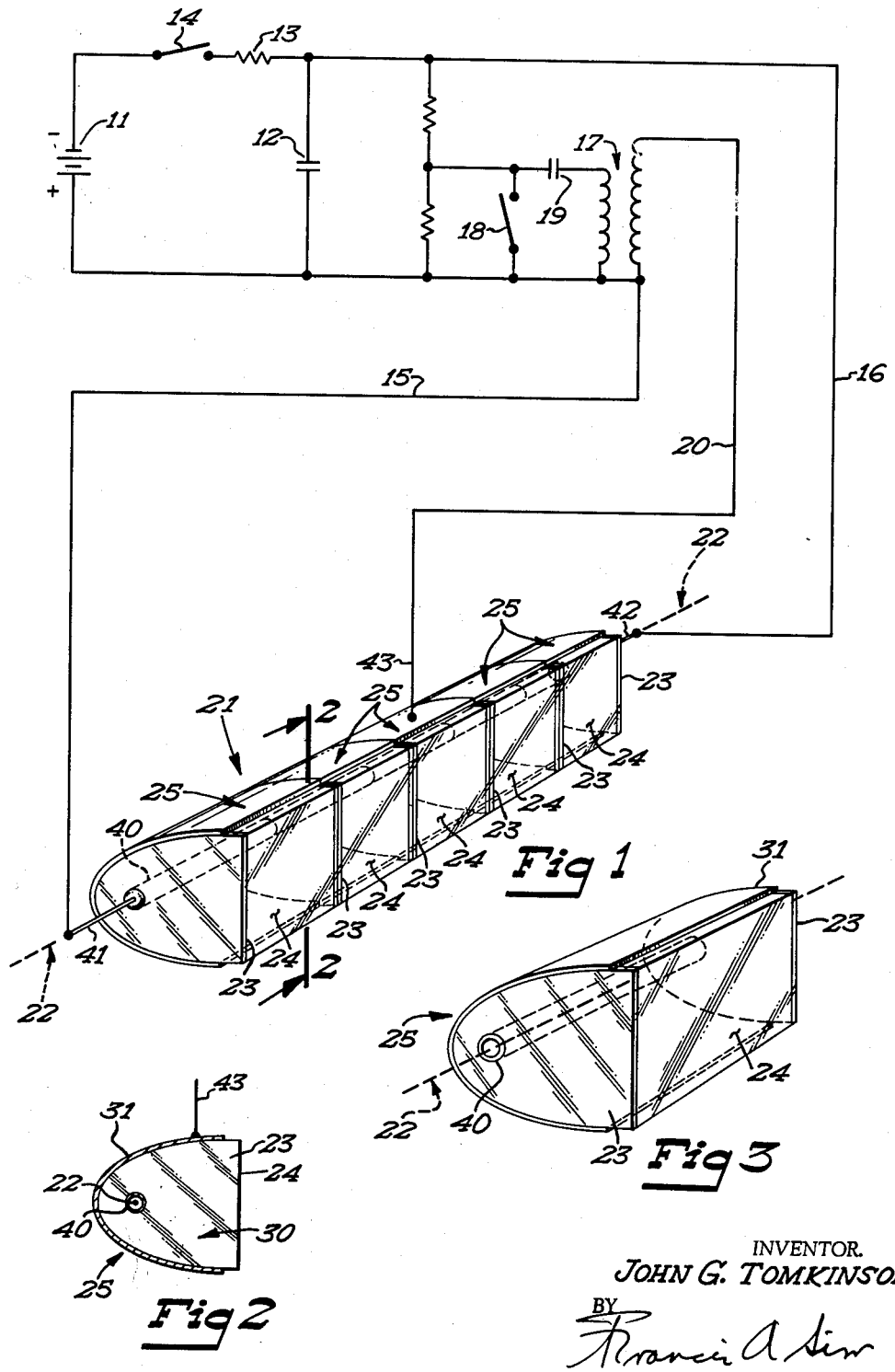

3,127,113
PHOTOGRAPHIC FLASH TUBE AND REFLECTOR
John G. Tomkinson, Denver, Colo., assignor to Minneapolis-Honeywell Regulator Company, Minneapolis, Minn., a corporation of Delaware
Filed Apr. 18, 1962, Ser. No. 188,448
4 Claims. (Cl. 240—1.3)

The present invention is concerned with a photographic flash tube and reflector having a compact unitary construction facilitating control of the light pattern by the use of a structure being of light weight and small physical dimension.

Specifically, the present invention utilizes a combination flash tube and reflector constructed and arranged of a plurality of reflector-flash tube sections which may be molded or otherwise formed of plastic or glass or of a like material which is transparent, and wherein certain surfaces are metalized, or silvered, or otherwise made reflective and certain other surfaces are coated with a non-transparent, nonreflective material.

Specifically, the present invention is directed to an electronic photographic flash tube-reflector of the type for use with the so-called electronic flash unit. Flash units of this type are characterized as flash units in which electrical energy is stored in a capacitor and suddenly discharged through a gaseous discharge flash tube to provide a brilliant flash of light. Flash tubes of this type are reusable many times. The flash tube discharge is initiated by a starting electrode, associated with one of the main discharge electrodes of the flash tube. Such a starting electrode is connected to a switch, normally the shutter switch of an associated camera, to initiate the flash of light.

Flash units of this type have found wide acceptance because of the low cost per photograph. More recent developments in the photographic art have provided flash units of the electronic type wherein the unit is contained in a single housing adapted to be mounted at or near the camera, to increase the convenience and usefulness to the photographer. In order to accomplish this with the optimum results, the weight and size of the flash unit is limited, consistent with providing an adequate quantity of light and an adequate light pattern on the subject to be photographed.

With the above general observations in mind, the present invention provides a new and unique photographic flash tube and reflector which is small, lightweight, and provides convenient means of controlling the light patterns. Specifically, the present invention utilizes a plurality of sections of glass, or the like material, which may be identical in shape, and which have mating end surfaces such that the sections may be placed end to end to produce an elongated structure.

The forward face of this structure is generally flat in configuration. Opposite this flat forward face is a curved portion which can be characterized as being formed of a curve having the apex generally opposite the forward face and having a focal point lying within the solid glass material. An opening is formed at the locus of the focal point of such a curve, that is, at the focal line of the curved surface, and this opening is constructed and arranged to contain an electronic flash tube, including the two main current conducting electrodes of such a flash tube. Specifically, the opening may be constructed and arranged to receive an individual flash tube including a glass envelope, or as an alternative, the opening and surrounding glass of the solid glass sections may in and of themselves constitute the glass envelope of the flash tube, the electrodes of the flash tube being sealed at the opposite ends of the elongated member formed by a number of such sections.

The mating walls between the adjacent glass sections are formed with an opaque coating material and the width of the glass sections, and thereby the distance between the opaque walls, controls the light pattern along the axis of the elongated member defined by the flash tube and the aligned opening formed in the sections.

To control the light pattern in a direction generally normal to this axis, the curved section of each of the glass sections is formed with a reflective coating. Thus, this reflective coating forms a reflector whose focal line coincides with the electronic flash tube. While this curve may take a number of shapes, it is generally an ellipse or a parabola. The reflective coating also constitutes the starting electrode for the flash tube. This coating, associated with the flash tube located at the focal line of the coating, is connected to a triggering source of voltage and is effective, when a triggering voltage is applied thereto, to initiate a discharge between the main current conducting electrodes of the flash tube. The light thus generated is controlled in a direction generally normal to the axis of the combination flash tube and reflector by means of the reflective coating placed on the curve of the glass sections, whereas the light pattern in a direction parallel to this axis is controlled by the end walls of the individual glass sections, which walls, as described above, are provided with a coating, preferably opaque.

The present invention will be apparent to those skilled in the art upon reference to the following specification, claims, and drawings, of which:

FIGURE 1 is a perspective view of the photographic flash tube and reflector of my invention, showing the three electrodes thereof connected to an electrical circuit of a high voltage battery operated electronic flash unit, FIGURE 2 is a section view of the flash tube and reflector, taken along the line 2—2, and FIGURE 3 is a perspective view, similar to FIGURE 1, of a single individual section of the flash tube and reflector of FIGURE 1.

Referring specifically to FIGURE 1, reference numeral 10 designates generally an electronic flash unit of the type having a high voltage battery 11 connected to charge a main flash capacitor 12 through a resistor 13 and on-off switch 14. Capacitor 12 is connected directly to conductors 15 and 16, and also to means including a triggering transformer 17. As is well known, triggering transformer 17 is energized by means of a switch 18, effective to discharge a capacitor 19 through the primary of this transformer to thereby apply a high voltage pulse between conductors 15 and 20. Switch 18 may in fact be a switch associated with the shutter of an associated camera and may be closed in synchronism with the opening of the camera shutter.

Reference numeral 21 designates generally my photographic flash tube and reflector, associated with the electronic flash unit 10. As can be seen, this construction 21 consists of a number of individual sections, in building block fashion, producing an elongated construction along the axis generally defined by reference numeral 22.

Specifically, the construction of FIGURE 1 is made up of five similar sections placed end to end. Specifically, each of the sections is provided with end walls 23, front face walls 24, and curved walls 25 opposite front face wall 24.

Referring to FIGURE 2, one of the sections of the combination flash tube and reflector is shown in cross-section. It can be seen that the main portion consists of a solid block of glass or the like material, identified by reference numeral 30. The curved wall portion 25 is formed of a curve having its apex directly opposite wall 24 and having a focal point coinciding with axis 22. This wall 25 includes a reflective coating identified by means of reference numeral 31 on FIGURE 2. It will be recognized that such a coating may be metalized silver, or otherwise made reflective. The front surface 24 may be flat or may be shaped to form a lens, as desired.

In FIGURE 3 a single section of the reflector is seen, and from this figure it can be seen that end walls 23 are formed of a coating, preferably an opaque coating, such that each individual section is in fact a closed reflector. The light pattern normal to axis 22 is controlled by the configuration of the curve of surface 25 on which reflector 31 is deposited. The light pattern parallel to axis 22 may be controlled by the spacing of the side walls 23. Thus, the combination of the coating on the end walls 23 and the reflective surface on the curved wall 25 restricts the light pattern to a general rectangular or pyramid shape which can be constructed and arranged to coincide with the viewing cone angle of an associated photographic camera.

Each of these individual sections is provided with an opening 40 coinciding with axis 22. This opening is adapted to receive, or to become a part of, an electronic flash tube including a pair of main current conducting electrodes 41 and 42 and including a starting electrode 43 including the reflecting surface 31. Thus, reflective surface 31 is formed of electrical conductive material.

From the above description it can be seen that I have provided a unique photographic flash tube and reflector which can be constructed and arranged to be lightweight and of a small size, to thus facilitate the construction of a photographic flash unit having a controllable light pattern, controllable by virtue of the coated walls 23 and the reflecting surface 31.

In practice, the closing of switch 18, shown in FIGURE 1, provides a high voltage pulse between the starting electrode 43 and main discharge electrode 41 to initiate a discharge between the main current conducting electrodes 41 and 42 as capacitor 12 discharges through the flash tube along axis 22 and through the opening 40 formed in each of the glass sections. Thus, the electrical discharge is accurately positioned at the focal line of reflector 31 to provide the optimum in light efficiency.

For certain applications, such as wide angle use, it may be desirable to misalign the individual sections of my construction, rotating the sections about axis 22. For example, alternate sections could be tilted upward to provide a wider vertical beam width. This could be selectively accomplished by manual means under the control of the photographer.

The use of the sectional building block flash tube and reflector of my invention not only facilitates adequate control of the light pattern of the flash unit, but also allows the flash tube to be made of a length as determined by the number of individual reflector flash tube sections to be joined end to end, as shown in FIGURE 1.

Modifications of the present invention will be apparent to those skilled in the art and it is thus intended that the scope of the present invention be limited solely by the scope of the appended claims.

I claim as my invention:

1. A combination photographic flash tube and reflector, comprising;
   a plurality of individual sections formed of solid light transparent material placed end to end to form an elongated member, each section having a first surface thereof formed of a diverging curve having a focal line within that section, and having mating end surfaces,
   electrically conductive reflector means on said first surface, a nonreflective coating on said end surfaces, said first surface and said end surfaces defining a closed reflector,
   flash tube means including an opening formed in each of said sections along said focal line, and including main discharge electrodes between which an electrical discharge may take place along the focal line,
   and electrical starting means including said reflector means adapted to initiate such a discharge.

2. A compact unitary photographic flash tube and reflector, comprising;
   an elongated portion formed of a plurality of identical members each of which is constructed of a solid light transparent material, each of said members having a generally flat front face, end surfaces adapted to mate with adjoining identical members, and a geometric surface forming the other three sides of the member, said geometric surface being formed as a curve the locus of whose focal point defines a focal line within said member,
   an opening in each of said members formed to coincide with said line,
   electrically conductive reflector means formed on each of said members on the geometric surface thereof,
   an opaque coating on the end surfaces thereof, flash tube means constructed and arranged within said opening and including main discharge electrode,
   and a trigger electrode for said flash tube including as a portion thereof said reflector means.

3. A sectional flash tube and reflector structure comprising;
   a plurality of similarly constructed solid light transparent members, each of said members having a front face, adjoining end walls, and a curved surface joined to said front face and end walls to complete the exterior, said curved surface being formed of a geometric curve whose apex lies opposite said front face and whose focal line lies within said member, an opening formed coincident with said focal line,
   nonreflective, nontransparent means formed on said end walls of each of said members,
   said members being placed end to end to form an elongated structure with the front face, the curved surface, and the opening of each member aligned,
   and flash tube means constructed and arranged within the openings in said members.

4. In combination with a photographic flash unit having a main flash capacitor and flash tube triggering means,
   an elongated member of light transparent material, said member being formed of individual sections having abutting end walls with an opaque coating therebetween, having aligned front walls, having aligned curved walls opposite the front walls, said curved walls being characterized as a geometrically curved surface having a focal line lying within said elongated member, and having an aligned opening extending through said elongated member coincident to said focal line, to define an axis of said elongated member,
   an elongated electrically conductive reflective surface on said curved walls,
   flash tube means including a pair of main discharge electrodes constructed and arranged within said openings to thus position said flash tube members at said focal line whereby a resulting light pattern is controlled by the reflective curved surface on said curved walls in a direction normal to said axis and by the opaque coating between said end walls in a direction along said axis, and electrical conductor means connecting said main discharge electrodes to the capacitor and connecting the reflective surface on said curved walls to the triggering means.

References Cited in the file of this patent

UNITED STATES PATENTS

| | | |
|---|---|---|
| 2,561,885 | Prideaux et al. | July 24, 1951 |
| 2,749,482 | Fruengel | June 5, 1956 |
| 2,825,260 | O'Brien | Mar. 4, 1958 |
| 2,906,862 | McCammon | Sept. 29, 1959 |
| 2,953,721 | Chauvineau | Sept. 20, 1960 |
| 2,998,597 | Edwards | Aug. 19, 1961 |
| 3,037,139 | Myers | May 29, 1962 |

FOREIGN PATENTS

| | | |
|---|---|---|
| 1,111,017 | Germany | July 13, 1961 |